(12) United States Patent
Khojastepour et al.

(10) Patent No.: US 12,009,890 B2
(45) Date of Patent: Jun. 11, 2024

(54) CODEBOOK DESIGN FOR BEAMFORMING IN 5G AND BEYOND MMWAVE SYSTEMS

(71) Applicant: NEC Laboratories America, Inc., Princeton, NJ (US)

(72) Inventors: Mohammad Khojastepour, Lawrenceville, NJ (US); Nariman Torkzaban, College Park, MD (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 17/856,305

(22) Filed: Jul. 1, 2022

(65) Prior Publication Data

US 2023/0027513 A1    Jan. 26, 2023

Related U.S. Application Data

(60) Provisional application No. 63/218,586, filed on Jul. 6, 2021.

(51) Int. Cl.
*H04B 7/0456* (2017.01)
*H04B 7/06* (2006.01)

(52) U.S. Cl.
CPC ......... *H04B 7/0482* (2013.01); *H04B 7/0617* (2013.01)

(58) Field of Classification Search
CPC ............................ H04B 7/0617; H04B 7/0482
USPC ....................................................... 375/267
See application file for complete search history.

(56) References Cited

U.S. PATENT DOCUMENTS

| | | | |
|---|---|---|---|
| 6,218,985 B1* | 4/2001 | Adams | H01Q 3/26 342/372 |
| 2020/0243985 A1* | 7/2020 | Petersson | H04B 7/0617 |
| 2021/0226674 A1* | 7/2021 | Ramireddy | H04B 7/0417 |
| 2022/0124714 A1* | 4/2022 | Raghavan | H04W 72/0453 |

OTHER PUBLICATIONS

Alkhateeb et al., "Channel Estimation and Hybrid Precoding for Millimeter Wave Cellular Systems", IEEE Journal of Selected Topics in Signal Processing, vol. 8, No. 5, Oct. 2014, pp. 831-846.
Love et al., "Grassmannian Beamforming for Multiple-Input Multiple-Output Wireless Systems", IEEE transactions on Information theory. Oct. 14, 2003, pp. 1-5.

(Continued)

*Primary Examiner* — Leila Malek
(74) *Attorney, Agent, or Firm* — Joseph Kolodka

(57) ABSTRACT

A communications system for hybrid beamforming is provided. The communications system includes a base station encoding data into a plurality of streams, each transmitted through a radio frequency chain. The communication system further includes a beamforming codebook including a set of beamforming codewords. The communications system also includes a beamformer transmitting a given one of the plurality of streams through multiple antennas by adjusting a phase and a gain of symbols of the given one of the plurality of streams for each of the multiple antennas by using a corresponding beamforming coefficient of a given beamforming codeword chosen from the beamforming codebook. A beam and its corresponding beamforming codeword is designed such that the mean squared error between the beam pattern generated with the given beamforming codeword and a given beam pattern is minimized.

19 Claims, 7 Drawing Sheets

(56) References Cited

OTHER PUBLICATIONS

Noh et al., "Multi-Resolution Codebook and Adaptive Beamforming Sequence Design for Millimeter Wave Beam Alignment", IEEE Transactions on Wireless Communications. Jun. 13, 2017, pp. 1-16.

* cited by examiner

CODEBOOK DESIGN FOR BEAMFORMING IN 5G AND BEYOND MMWAVE SYSTEMS

RELATED APPLICATION INFORMATION

This application claims priority to U.S. Provisional Patent Application No. 63/218,586, filed on Jul. 6, 2021, incorporated herein by reference in its entirety.

BACKGROUND

Technical Field

The present invention relates to cellular communications and more particularly to codebook design for beamforming in 5G and beyond mmWave systems.

Description of the Related Art

Millimeter Wave (mmWave) is one of the key enablers of 5G wireless systems. However, due to the severe pathloss and poor scattering associated with mmWave frequency bands, effective beamforming techniques employing massive MIMO systems are essential. Hybrid beamforming is the main technique when massive MIMO is employed and channel estimation is not practical in all antennas. The perfect codebook of the beams for the last beamforming stage of hybrid beamforming should partition the azimuth angle into arcs where a beam covers an arc with uniform gain and sharply drops outside of the arc.

SUMMARY

According to aspects of the present invention, a communications system for hybrid beamforming is provided. The communications system includes a base station encoding data into a plurality of streams, each transmitted through a radio frequency chain. The communication system further includes a beamforming codebook including a set of beamforming codewords. The communications system also includes a beamformer transmitting a given one of the plurality of streams through multiple antennas by adjusting a phase and a gain of symbols of the given one of the plurality of streams for each of the multiple antennas by using a corresponding beamforming coefficient of a given beamforming codeword chosen from the beamforming codebook. A beam and its corresponding beamforming codeword is designed such that the mean squared error between the beam pattern generated with the given beamforming codeword and a given beam pattern is minimized.

According to other aspects of the present invention, a method for hybrid beamforming in a communications system is provided. The method includes encoding, by a base station, data into a plurality of streams, each transmitted through a radio frequency chain. The method further includes forming a beamforming codebook including a set of beamforming codewords. The method also includes transmitting, by a beamformer, a given one of the plurality of streams through multiple antennas by adjusting a phase and a gain of symbols of the given one of the plurality of streams for each of the multiple antennas by using a corresponding beamforming coefficient of a given beamforming codeword chosen from the beamforming codebook. A beam and its corresponding beamforming codeword is designed such that the mean squared error between the beam pattern generated with the given beamforming codeword and a given beam pattern is minimized.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to codebook design for beamforming in 5G and beyond mmWave systems.

Embodiments of the present invention provide an antenna structure invention as well as a beamforming design invention.

Regarding the antenna structure invention, a solution is proposed based on a novel antenna configuration, namely, Twin Uniform Linear Array (TULA). Consequently, two antenna configurations based on TULA, namely Delta and Star, are proposed.

Regarding the beamforming design invention, low-complexity analytical closed form solutions are derived both for Uniform Linear Array (ULA) and TULA and their effectiveness to reach close-to-perfect (i.e., uniform and sharp) beams and maximizing the beamforming gain for each beam is illustrated.

Figure 1:
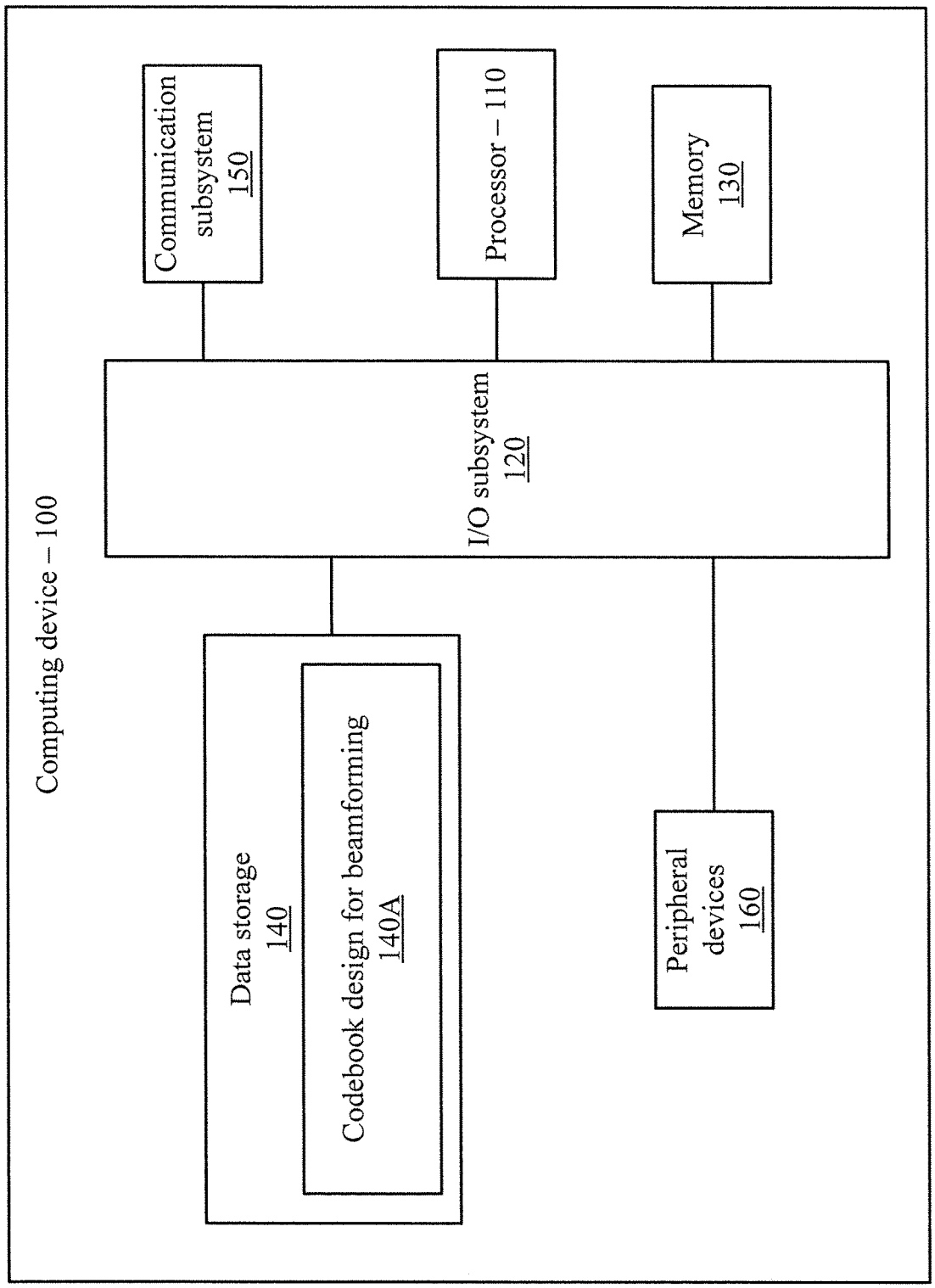
FIG. 1 is a block diagram showing an exemplary computing device, in accordance with an embodiment of the present invention.

FIG. 1 is a block diagram showing an exemplary computing device 100, in accordance with an embodiment of the present invention. Computing device 100 can be base station/transmitter in FIG. 2, in accordance with one implementation. The computing device 100 is configured to perform codebook design for beamforming in 5G and beyond mmWave systems.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for codebook design for beamforming in 5G and beyond mmWave systems. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. 2These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention Notation $\mathbb{C}$ denotes the field of complex numbers, $\mathbb{Z}$ denotes the ring of integers, $\mathcal{CN}(m, \sigma^2)$ denotes the complex normal distribution with mean m and variance $\sigma^2$, [a, b] is the closed interval between a and b, U [a, b] denotes the uniform distribution in the closed interval [a,b]. $1_{a,b}$ is the a×b all ones matrix, $I_N$ is the N by N identity matrix, ceil(•) is the ceiling function, E[•] is the expectation operator, $\not\models_{[a,b]}$ is the indicator function, $\|\cdot\|_p$ is the p-norm, $\odot$ is the Hadamard product, $\otimes$ is the Kronecker product, $A^H$, $A^*$, $A_{a,b}$ $v_{max}\{A\}$ denote conjugate transpose, element-wise complex conjugate, (a, b)$^{th}$ entry, and principal eigenvector of the matrix A, respectively.

Figure 2:
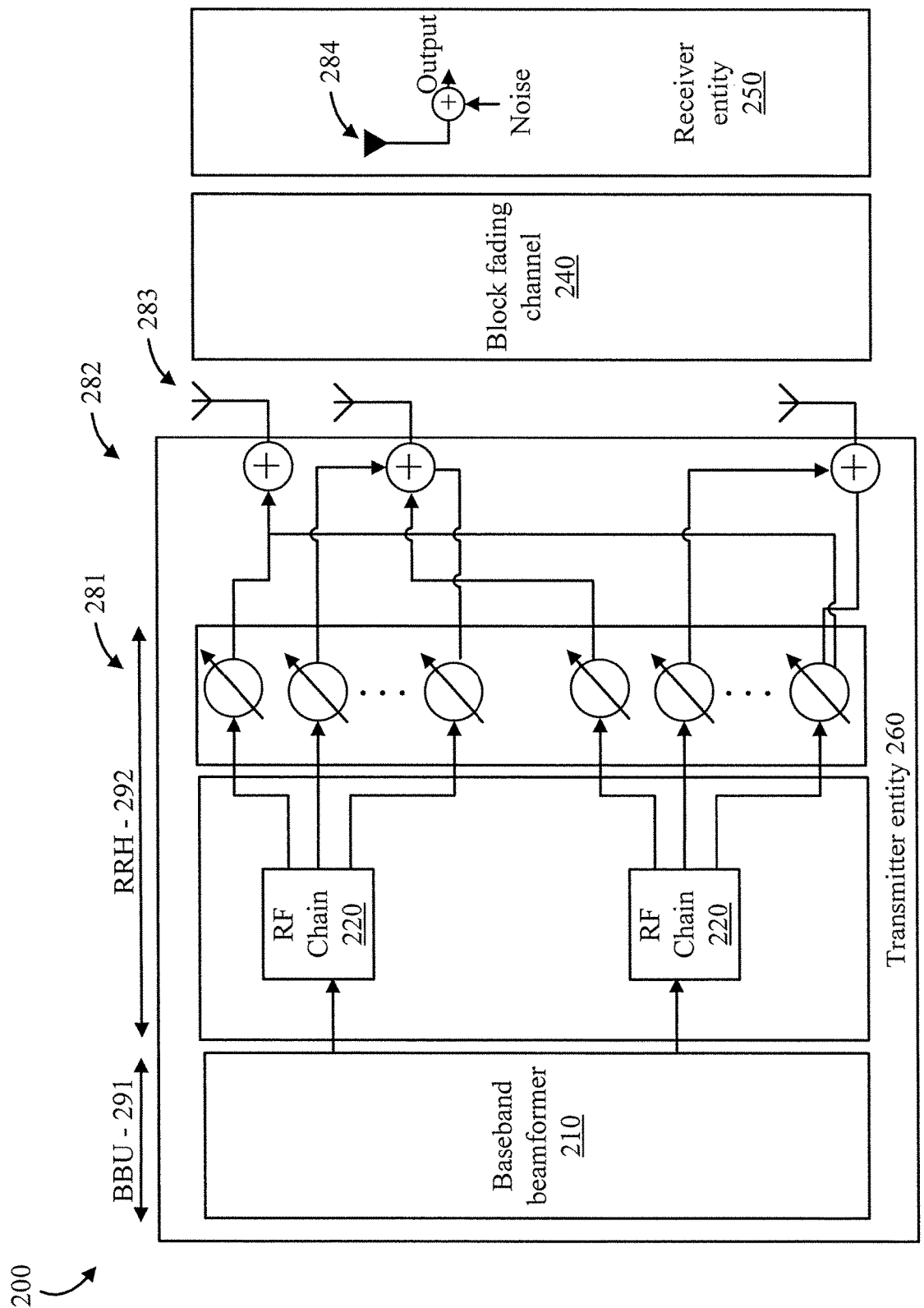
FIG. 2 is a block diagram showing an exemplary system, in accordance with an embodiment of the present invention.

FIG. 2 is a block diagram showing an exemplary system 200, in accordance with an embodiment of the present invention.

The system 200 includes a base station as the transmitter 260 and a mobile user (MU) as the receiver 250. Given the practical limits of the MU equipment, stemming from its small antenna size, we focus our attention on designing the transmitter side. There, we consider a multiple input single output (MISO) system with $M_t$ antennas 283 at the transmitter 260 and a single antenna 284 at the receiver 250. The system is defined as follows:

$$y=\sqrt{\rho}h^H cs+n \quad (1)$$

with $s\in \mathbb{C}$ being the input symbol satisfying the power constraint (i.e., $E[|s|^2]\leq 1$), $c\in \mathbb{C}^{M_t}$ the unit-norm beamforming vector, $h\in \mathbb{C}^{M_t}$ the block fading channel vector, and $\rho$ the system signal-to-noise ratio (SNR), and the complex additive white Gaussian noise $n\sim \mathcal{CN}(0,1)$.

The Radio Remote Head (RRH) 292 may only include phase-array antennas realizing only analog beamforming, while under fully-digital beamforming, the beamforming coefficients control both gain and phase of the antenna elements, where we have only a single RF chain, i.e., $N_{RF}=1$. Under hybrid beamforming however, the antennas are wired to $N_{RF}>1$ chains, where it holds that $c=F_v$ for analog beamsteering matrix $F=[f_1, \ldots f_{N_{RF}}]\in \mathbb{C}^{M_t\times N_{RF}}$, and baseband weight vector $v\in \mathbb{C}^{N_{RF}}$. The first-layer digital beamformer at the Baseband Unit (BBU) 291 controls both gain and the phase and generates $N_{RF}$ streams and the second layer beamformer is a phased array antenna. Nonetheless, it is important to note that in either scenario the pilot transmission and channel estimation can only be done on the baseband. By the unit-norm constrain on c, it must hold that $\|F_v\|=1$.

Moreover, given that the beamsteering matrix F realizes only a set of phase shifts, all the vectors $f_n$, $n=1 \ldots N_{RF}$ are subject to an equal gain constraint defined as $|f_n^{(m)}|=1$, $m=1 \ldots M_t$.

It is presumed that each codebook C includes $Card(C)=Q$ codewords. Once a codeword $c_q$ is designed under the fully digital scheme, $F_q$ and $v_q$ are found subject to the above constraints to realize the hybrid beamforming scheme.

A description will now be given regarding the antenna array model, in accordance with an embodiment of the present invention.

It is presumed that the angle of departure (AoD) θ is uniformly distributed over the range $[-\pi,0]$. Suppose the antennas are placed at $r_m$, $m=0, \ldots, M_t-1$, for some 2D vector $r_m$. For every beamforming vector c, the gain of the antenna array at every AoD θ is proportional to the following:

$$G(c, \theta) = \left|\sum_{m=0}^{M_t-1} c^{(m)} e^{j\frac{2\pi}{\lambda}[\cos\theta, \sin\theta]r_m}\right|^2 \quad (2)$$

Various configurations are considered for the array of antennas, namely ULA, TULA, Delta (Δ), and Star, as described with respect to FIGS. 3, 4, 5, and 6, respectively.

Figure 3:
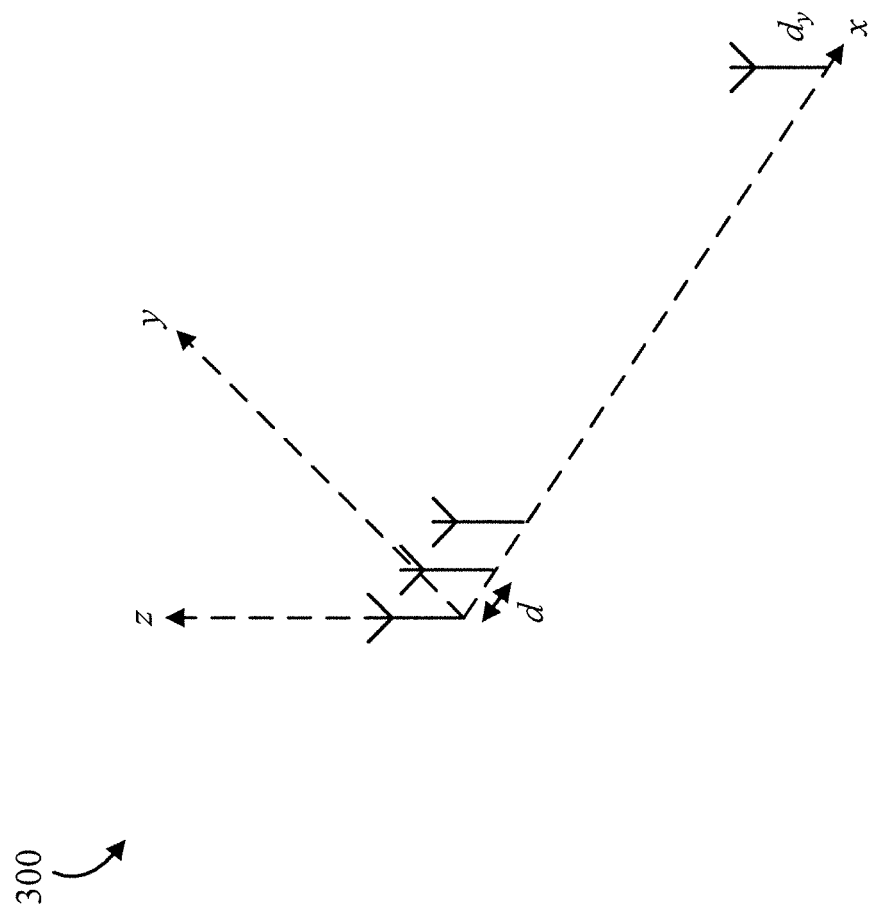
FIG. 3 is a diagram showing an example Uniform Linear Array (ULA) antenna configuration, in accordance with an embodiment of the present invention.

That is, FIG. 3 is a diagram showing an example Uniform Linear Array (ULA) antenna configuration 300, in accordance with an embodiment of the present invention.

Figure 4:
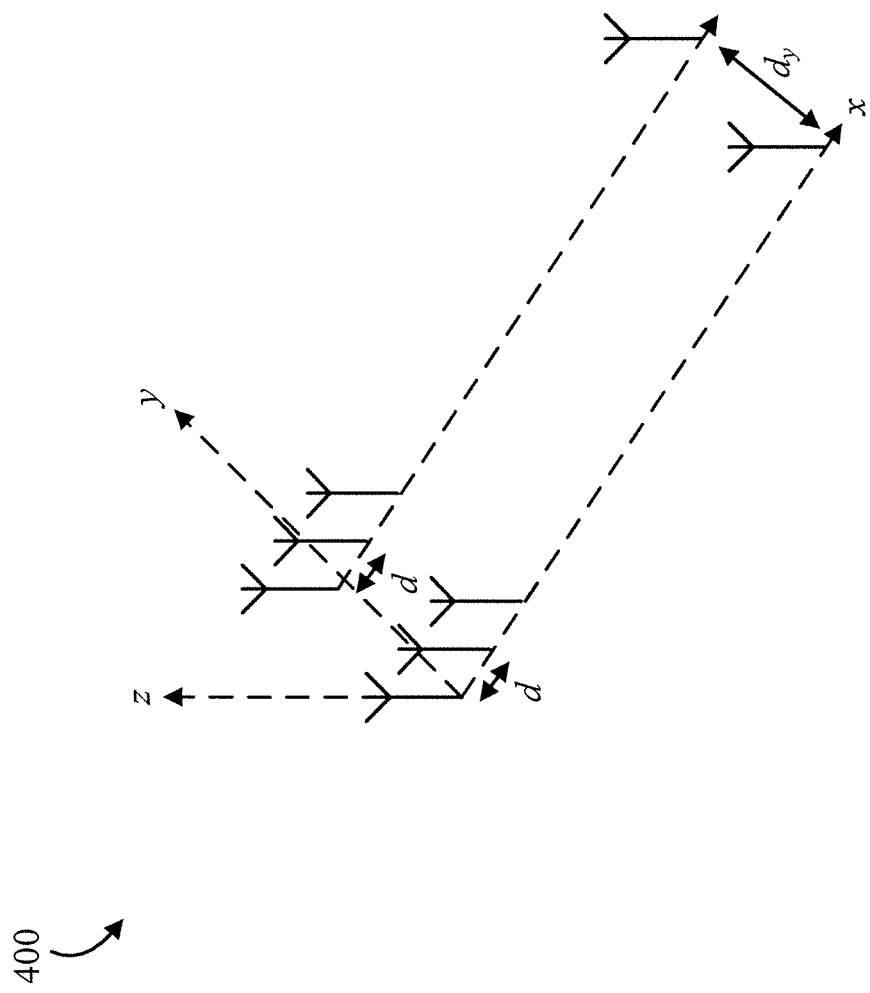
FIG. 4 is a diagram showing an exemplary Twin Uniform Linear Array (TULA) antenna configuration, in accordance with an embodiment of the present invention.

FIG. 4 is a diagram showing an exemplary Twin Uniform Linear Array (TULA) antenna configuration 400, in accordance with an embodiment of the present invention.

Figure 5:
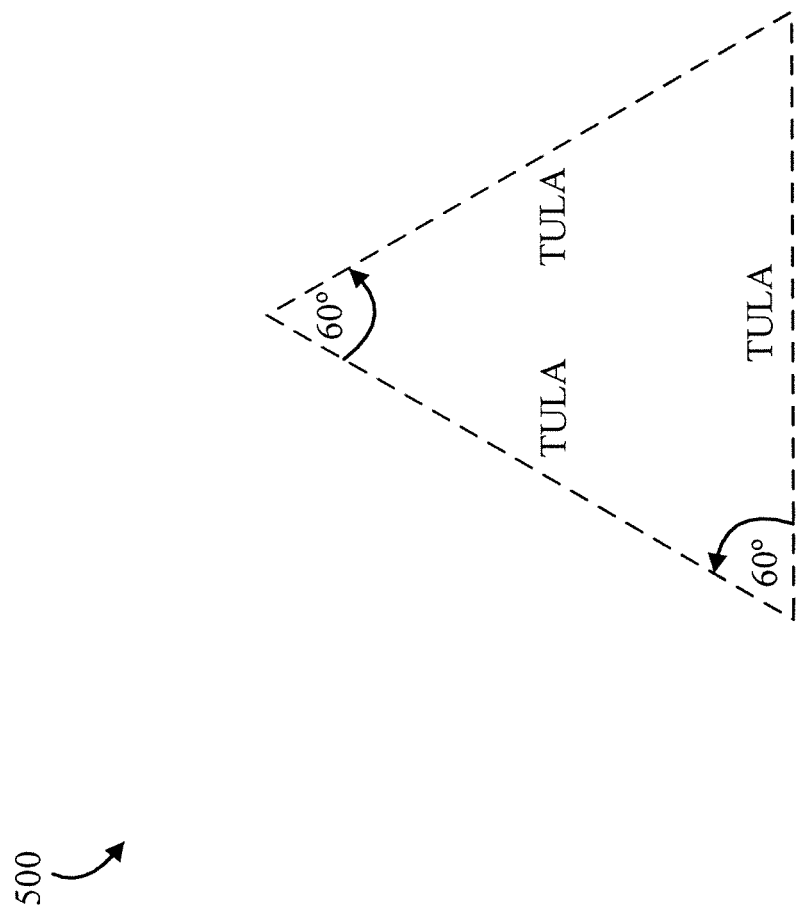
FIG. 5 is a diagram showing an exemplary Delta ($\Delta$) antenna configuration, in accordance with an embodiment of the present invention.

FIG. 5 is a diagram showing an exemplary Delta (Δ) antenna configuration 500, in accordance with an embodiment of the present invention.

Figure 6:
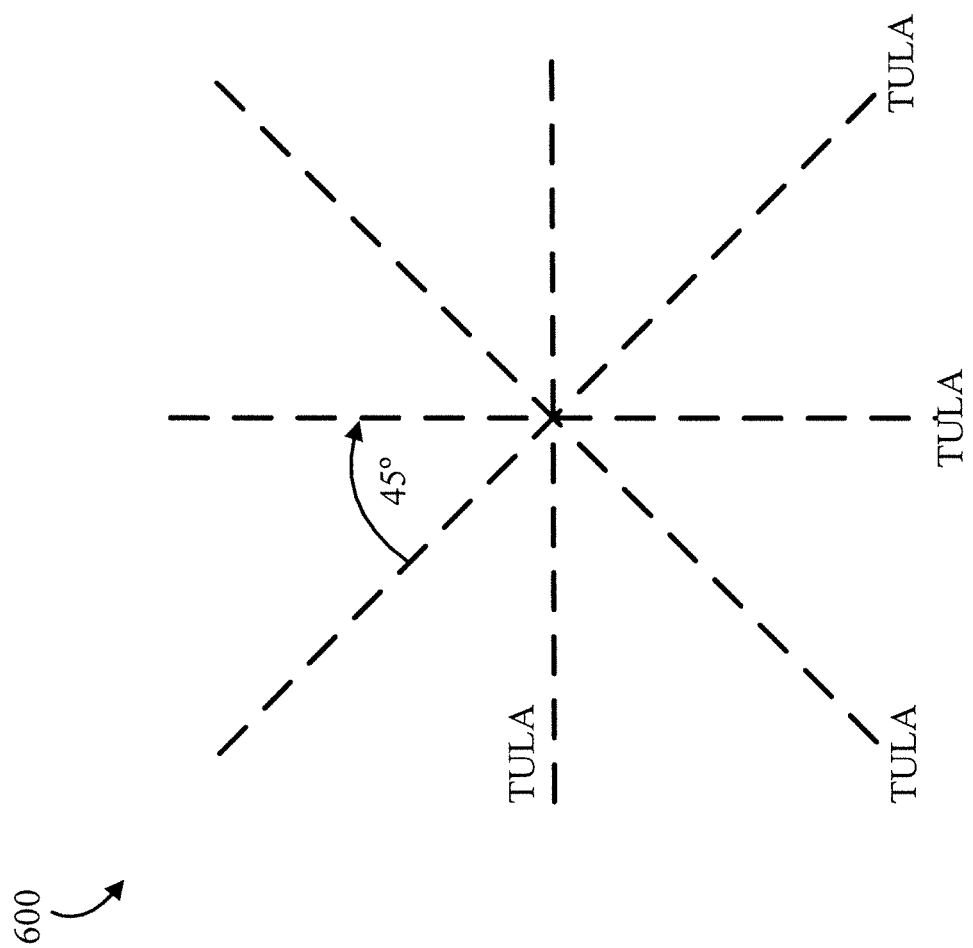
FIG. 6 is a diagram showing an exemplary Star antenna configuration, in accordance with an embodiment of the present invention.

FIG. 6 is a diagram showing an exemplary Star antenna configuration 600, in accordance with an embodiment of the present invention.

A ULA is defined as $r_m=mde_x$, for some $d\in \mathbb{R}^+$, thus the following is obtained:

$$G^{ula}(c, \theta) = \left|\sum_{m=0}^{M_t-1} c^{(m)} e^{j\frac{2\pi md}{\lambda}\cos\theta}\right|^2 \quad (3)$$

A half-wavelength ULA, i.e., $$d = \frac{\lambda}{2},$$

is considered herein. Further, a change of variable is introduced as $\psi=\pi\cos\theta$ where $\psi\in[-\pi, \pi]$. It is then straightforward to write the following:

$$G^{ula}(\psi,\theta)=|d_{ula,M_t}^H(\psi)c|^2 \quad (4)$$

where $$d_{ula,M_t}(\psi)=[1,e^{j\psi}, \ldots, e^{j(M_t-1)\psi}]^T \quad (5)$$

A TULA of $M_t$ antennas is defined as follows:

$$r_m = mde_x, \quad m = 0, \ldots, \frac{M_t}{2} - 1 \quad (6)$$

$$r_m = mde_x + d_y e_y, \quad m = \frac{M_t}{2}, \ldots, M_t - 1$$

Herein, $$d_y = \frac{\lambda}{3},$$

and another auxiliary variable $$\phi = \frac{2\pi}{3}\sin\theta.$$

Following equation (2) for the gain of the TULA, the following is derived:

$$G^{tula}(c, \theta) = |d_{tula,M_t}^H c|^2 \text{ where} \quad (7)$$

$$d_{tula,M_t}(\theta) = \left[1, e^{j\psi}, \ldots, e^{j\left(\frac{M_t}{2}-1\right)\psi},\right.$$

$$\left. e^{j\phi}, e^{j(\phi+\psi)}, \ldots, e^{j\left(\phi+\left(\frac{M_t}{2}-1\right)\psi\right)}\right]^T \quad (8)$$

or equivalently $$d_{tula,M_t}(\psi, \phi) = \left[ d^T_{ula,\frac{M_t}{2}}(\psi), e^{j\phi} d^T_{ula,\frac{M_t}{2}}(\psi) \right]^T \quad (9)$$

As shown in FIG. 5, a Delta (Δ) configuration of antennas is defined as an equilateral triangle consisting of 3 TULA of antennas, one on each side.

As shown in FIG. 6, a Star configuration includes 4 co-centric TULA legs each of which being a $$\frac{\pi}{4}$$

rotation of its predecessor. The spacing between the antennas remains as explained before.

A description will now be given regarding codebook design problem formulation.

For convenience, hereinafter the index ula is dropped from the expression of the array factor $d_{ula,M_t}(\psi)$ and gain $G^{ula}(\psi, c)$. Before presenting the formulation of the codebook design problem, some new notations are introduced. The angular range of $\theta \in [-\pi, 0]$ is divided into equal length beams $w_q$ for $q \in \{1, \ldots, Q\}$, i.e., $$\omega_q = [\theta_{q-1}, \theta_q], \theta_q = -\pi + \frac{\pi}{Q}q$$

Corresponding to $\omega_q$ intervals, there exists $v_q$ ranges with respect to $\psi$ such that $$v_q = [\psi_{q-1}, \psi_q], \psi_q = -\pi \cos\left(\frac{\pi}{Q}q\right)$$

Under the reference gain as in Equation (4) and using Parseval's theorem, the following is obtained:

$$\int_{-\pi}^{\pi} G(\psi, c) d\psi = 2\pi \|c\|^2 = 2\pi \quad (10)$$

Let $G_{ideal,q}(\psi)$ denote the desired ideal gain which is supposed to be constant on $v_q$ and zero otherwise. It must hold that $$\int_{-\pi}^{\pi} G_{ideal,q}(\psi) d\psi = \int_{v_q} t d\psi + \int_{[-\pi,\pi] \setminus v_q} 0 d\omega = (\psi_q - \psi_{q-1}) t = 2\pi \quad (11)$$

which in turn will give the following:

$$G_{ideal,q}(\psi) = \frac{2\pi}{(\psi_q - \psi_{q-1})} 1_{v_q}(\psi), \psi \in [-\pi, \pi] \quad (12)$$

We aim to design the codebooks so as to mimic the ideal gain computed in Equation (12). Therefore, the plain codebook design problem is formulated as a minimization of a MSE as follows:

$$c_q^{opt} = \operatorname*{argmin}_{c, \|c\|=1} \int_{-\pi}^{\pi} |G_{ideal,q}(\psi) - G(\psi, c)| d\psi \quad (13)$$

By uniformly sampling on the range of we can rewrite the optimization problem as follows:

$$\operatorname*{argmin}_{c, \|c\|=1} \left[ \lim_{L \to \infty} \sum_{p=1}^{Q} \delta_p \sum_{\ell=1}^{L} \frac{|G_{ideal,q}(\psi_{p,\ell}, c)|}{L} \right] \quad (14)$$

where for $q=1 \ldots Q$, $$\delta_q = \psi_q - \psi_{q-1}, \psi_{q,\ell} = \psi_{q-1} + \frac{\delta_q(\ell - 0.5)}{L}$$

Equation (14) can be written as follows:

$$c_q^{opt} = \operatorname*{argmin}_{c, \|c\|=1} \lim_{L \to \infty} \frac{1}{L} \|G_{ideal,q} - G(c)\| \text{ where} \quad (15)$$

$$G(c) = [\delta_1 G(\psi_{1,1}, c) \ldots \delta_Q G(\psi_{Q,L}, c)]^T \in \mathbb{Z}^{LQ} \text{ and,}$$

$$G_{ideal,q} = [\delta_1 G_{ideal,q}(\psi_{1,1}) \ldots \delta_Q G_{ideal,q}(\psi_{Q,L})]^T \in \mathbb{Z}^{LQ}$$

Note that it holds that $$G_{ideal,q} = 2\pi(e_q \otimes 1_{L,1}) \quad (16)$$

with $e_q \in \mathbb{Z}^Q$ being the standard basis vector for the q-th axis among Q ones. Now, note that $1_{L,1} = g \odot g^*$ for any equal gain $g \in \mathbb{C}^L$. Therefore, for a suitable choice of g we can write:

$$G_{ideal,q} = 2\pi(e_q \otimes (g \odot g^*)) = \left(\sqrt{2\pi}(e_q \otimes g)\right) \odot \left(\sqrt{2\pi}(e_q \otimes g)\right)^* \quad (17)$$

Similarly, it is straightforward to observe the following:

$$G(c) = (D^H c) \odot (D^H c)^* \quad (18)$$

where $D = [\sqrt{\delta_1} D_1 \ldots \sqrt{\delta_Q} D_Q] \in \mathbb{C}^{M_t \times LQ}$, and $$D_q = [D_{M_t}(\psi_{q,L})] \in \mathbb{C}^{M_t \times L}$$

Comparing the expressions (15), (17), and (18), one can show the optical choice of $c_q$ in Equation (15) is the solution to the following optimization problem for a proper choice of $g_q$.

Problem 1. Given an equal-gain vector $g_q \in \mathbb{C}^L$, $q \in \{1, \ldots, Q\}$, find vector $c_q \in \mathbb{C}^{M_t}$ such that $$c_q = \operatorname*{argmin}_{c, \|c\|=1} \lim_{L \to \infty} \left\| \sqrt{2\pi}(e_q \otimes g_q) - D^H c \right\|^2 \quad (19)$$

However, we now need to find the optimal choice of that minimizes the objective in Equation (15). Using Equation (17) and (18), the following optimization problem is derived.

Problem 2. Find equal-gain $g_g \in \mathbb{C}^L$, $q=1, \ldots, Q$, such that $$g_q = \operatorname*{argmin}_{g} \left\| \operatorname{abs}(D^H c_q) - \sqrt{2\pi} \operatorname{abs}(e_q \otimes g) \right\|^2 \quad (20)$$

where abs(•) denotes the element-wise absolute value of a vector.

Hence, the codebook design for a system with full-digital beamforming capability is found by solving Problem 1 for proper choice of $g_q$ obtain as a solution to Problem 2. The codebook for hybrid beamforming is then found as $$\underset{F_q, v_q}{\text{argmin}} \|F_q v_q - c_q\|^2 \quad (21)$$

where the columns of $F_q \in \mathbb{C}^{M_t \times N_{RF}}$ are equal-gain vectors and $v_q \in \mathbb{C}^{N_{RF}}$. The solution may be obtained using simple, yet effective suboptimal algorithm such as Orthogonal Matching Pursuit (OMP).

A description will now be given regarding a proposed codebook design method, in accordance with an embodiment of the present invention.

To that end, a description will now be given regarding ULA setting, in accordance with an embodiment of the present invention.

Note that the solution to part (a) of problem (1) is the limit of the sequence of solutions to a least-square optimization problem as L goes to infinity. For each L, it is found that:

$$c_q^{(L)} = \sqrt{2\pi}(DD^H)^{-1}D(e_q \otimes g_q) \quad (22)$$

$$c_q^{(L)} = \sigma D_q g_q \quad (23)$$

where $$\sigma = \frac{\sqrt{2\pi\delta_q}}{L \sum_{p=1}^{2^B} \delta_p} = \frac{1}{L}\sqrt{\frac{\delta_q}{2\pi}},$$

noting that it holds that $$DD^H = \left(L \sum_{p=1}^{2^B} \delta_p\right) I_{M_t}$$

Using Equation (23), Equation (20) can now be rewritten as follows:

$$g_q = \underset{g}{\text{arg min}} \|\text{abs}(\sigma' D^H D(e_q \otimes g)) - \text{abs}(e_q \otimes g)\|^2 \quad (24)$$

where $$\sigma' = \frac{1}{2\pi L}.$$

The following theorem will be stated without formal proof.

Proposition. The maximizer of Equation (24) is in the form $g_q[1 \delta^\eta \ldots \delta^{\eta(L-1)}]^T$ for some $\eta$ where $$\alpha = e^{j\left(\frac{\delta_q}{L}\right)}.$$

The choice of g can be interpreted in terms of time-frequency analysis and DFT matrix as follows. Without loss of generality, consider $q=1$ and define the transformation $T(a, k)$ for a vector a and integer number k as a filter which generates a vector b with the same length as a where the $b_i = a_i$, $i=1, \ldots, k$ and $b_i = 0$ for $i > k$. Consider a full-rank square DFT matrix $B \in \mathbb{C}^{M_t \times M_t}$ for some k such that the entries in the first M rows and L columns are equal to the corresponding entries in $D_1$. We have $D^H D(e_1 \otimes g) = \delta_1 B^H T(BT(e_1 \otimes g, L), M_t)$. This can be interpreted as finding a time-limited signal $g \in \mathbb{C}^L$, i.e., the signal $T(e_1 \otimes g, L)$, such that after taking Fourier transform and then applying the filter $T(\bullet, M_t)$ (in frequency) and finally applying the inverse Fourier transform, the power distribution of the resulting signal in time is as close as possible to that of the chosen signal g. Since the regenerated signal in the time domain only contains the filtered frequencies in $T(\bullet, M_t)$, by choosing the appropriate value of the phase shift parameter $\eta$ the resulting shift in frequency domain can be controlled such that the frequency window between 0 and $M_t$ contains the maximum power, i.e., the principal components of the time signal g. On the other hand out of all signals with the same power distribution in time, the real signal has the maximum concentration of the power in frequency domain, i.e., around zero. In other words, the step function in time corresponds to a sinc function in frequency domain and by changing $\eta$, one can cause a frequency shift such that the peak of the sinc function happens close to the discrete frequency $M_t/2$.

An analytical closed form solution for $c_q$ can be found as follows. Then there is the following:

$$c_q^{(L)} = \sigma \sum_{l=1}^{L} g_{q,l} d_{M_t}(\psi_q, l) \quad (25)$$

$$= \sigma \sum_{l=1}^{L} g_q^{(l)} \left[1 \ldots e^{j(M_t-1)\psi_{q,l}}\right]^T$$

$$= \left[\sigma \sum_{l=1}^{L} g_q, l \ldots \sigma \sum_{l=1}^{L} g_{q,l} e^{j(M_t-1)\psi_{q,l}}\right]^T$$

Choosing $g_q$ as in the Proposition, the m-th element of the vector $c_q = \lim_{L \to \infty} c_q^{\{L\}}$, i.e., $c_{q,m}$ is given as follows:

$$c_{q,m} = \frac{1}{\sqrt{2\pi}} \lim_{L \to \infty} \frac{1}{L} \sum_{l=0}^{L-1} g_{q,l} e^{jm\psi_q, l+1)} \quad (26)$$

$$c_{q,m} = \frac{1}{\sqrt{2\pi}} \lim_{L \to \infty} \frac{1}{L} \sum_{l=0}^{L-1} g_{q,l} e^{jm\left(\psi_{q-1} + \frac{\delta_q(l+0.5)}{L}\right)} \quad (27)$$

$$c_{q,m} = \lim_{L \to \infty} \frac{1}{L} \sum_{l=0}^{L-1} \alpha^{(\eta+m)l} e^{jm\left(\psi_{q-1} + \frac{0.5\delta_q}{L}\right)} \quad (28)$$

$$c_q^{(m)} = e^{jm(\psi_{q-1})} \lim_{L \to \infty} \frac{1}{L} \sum_{l=0}^{L-1} \alpha^{(\eta+m)l} \quad (29)$$

$$c_q^{(m)} = e^{jm(\psi_{q-1})} \int_0^1 \alpha^{(\eta+m)Lx} dx \quad (30)$$

$$c_q^{(m)} = e^{jm(\psi_{q-1})} \int_0^1 e^{j\frac{2\pi(\eta+m)L}{L2^B}x} dx \quad (31)$$

$$c_{q,m} = \frac{1}{\sqrt{2\pi}} e^{jm\psi_{q-1}} \int_0^1 e^{j\xi x} dx \quad (32)$$

$$= \frac{1}{\sqrt{2\pi}} e^{j\left(m\psi_{q-1} + \frac{\xi}{2}\right)} \text{sinc}\left(\frac{\xi}{2\pi}\right)$$

where $\xi = \delta_q(\eta + m)$.

$$c_q^{(m)} = e^{jm}(\psi_{q-1}) \frac{e^{j\xi} - 1}{j\xi} \quad (33)$$

$$c_q^{(m)} = e^{jm\left(\psi_{q-1} + \frac{\xi}{2}\right)} \frac{e^{j\xi/2} - e^{-j\xi/2}}{j/2} \quad (34)$$

$$c_q^{(m)} = e^{jm\left(\psi_{q-1} + \frac{\xi}{2}\right)} \sin c\left(\frac{\xi}{2\pi}\right) \quad (35)$$

where $\sin c(t) = \frac{\sin(\pi t)}{\pi t}$.

However, note that the design under ULA antenna configuration suffers from multiple shortcomings. First, due to the behavior of ULA, any beam is symmetric with respect to the ULA axis (i.e., the line passing through the base of the antennas). This is observed easily by noticing that the reference gain equation (4) is an even function of θ. This means that any beams designed using ULA is two-sided, e.g., if there is a codework designed to excite the beam covering $$\left[\frac{\pi}{8}, \frac{\pi}{4}\right],$$

this codeword will excite the symmetric beam $$\left[\frac{-\pi}{4}, \frac{-\pi}{8}\right]$$

as well. Second, the gains corresponding to the codewords covering different beams vary considerably. In fact, even the ideal gain of the beams with equal beamwidth is varying based on the angular position of the beam (e.g., see equation (12)). Third, the beams that are close to the direction of the antennas are neither so sharp nor so stable in terms of gain. To deal with the first shortcoming, a novel configuration for antennas is introduced, namely TULA.

A description will now be given regarding TULA setting, in accordance with an embodiment of the present invention.

For each codeword $C_{q,twin}$, the expression for the reference gain is as before:

$$G(\theta, c_{q,twin}) = \left|d^H_{twin,M_t}(\theta)c_{q,twin}\right|^2 \quad (36)$$

where $$d_{twin,M_t}(\theta) = \left[d^T_{\frac{M_t}{2}}(\theta), e^{j\left(\frac{2\pi}{3}\sin(\theta)\right)}d^T_{\frac{M_t}{2}}(\theta)\right]^2$$

We also set $$c_{q,twin} = \left[c^T_{q,twin,\frac{M_t}{2}}, e^{j\beta}c^T_{q,twin,\frac{M_t}{2}}\right]^2 \quad (37)$$

For some $$c_{q,twin,\frac{M_t}{2}} \in \mathbb{C}^{\frac{M_t}{2}} \beta \in \mathbb{R}.$$

Therefore, we can write the following:

$$G(\theta, c_{q,twin}) = \left|d^H_{\frac{M_t}{2}}(\theta)c_{q,twin,\frac{M_t}{2}}\right|^2 \left|\left(1 + e^{j\left(\beta - \frac{2\pi}{3}\sin(\theta)\right)}\right)\right|^2$$

Further, the following is defined:

$$L(\theta) = \left|1 + e^{j\left(\beta - \frac{2\pi}{3}\sin(\theta)\right)}\right| = \left|\cos\left(\frac{\beta}{2} - \frac{\pi}{3}\sin(\theta)\right)\right| \quad (38)$$

Observing Equation (38), the TULA is decomposed into two parts. The first part is used to generate a gain similar to the desired one designed with a ULA configuration, and the second part is to reach the desired isolation level. More, precisely, the following is set:

$$c_{q,twin,\frac{M_t}{2}} = e^{j\left(m\psi_q - 1 + \frac{\xi}{2}\right)}\sin c\left(\frac{\xi}{2\pi}\right), \; m = 0 \ldots \frac{M_t}{2} - 1 \quad (39)$$

To capture the isolation requirement, the isolation factor $0 \leq \mu < 1$ as follows:

$$\mu = \int_{w_q} \frac{L(-\theta)}{L(\theta)} d\theta = \int_{w_q} \frac{\cos\left(\frac{\beta}{2} + \frac{\pi}{3}\sin(\theta)\right)}{\cos\left(\frac{\beta}{2} - \frac{\pi}{3}\sin(\theta)\right)} d\theta \quad (40)$$

to denote the level of isolation between each $w_q$ and its counterpart. Therefore, given any desired isolation level μ, it only remains to solve the last equation for β and plug into equation (37) to complete the TULA codebook design. BY virtue of the isolation factor incorporated into the codebook design framework, the first shortcoming can be effectively solved and one-sided beams generated. This design will provide another advantage by significantly improving the gain of the desired beams.

Nonetheless, the second and third shortcoming are still outstanding in the TULA framework. In order to address the second and third shortcomings, two more antenna configurations are proposed, namely Delta (Δ) and Star. Both configurations utilize multiple TULA models at the same time where each TULA is responsible for forming a number of the beams. In other words, each of the TULA's will be excited only with those codewords that generate the sharpest and most stable beams that at the same time generate high gains at that interval.

Figure 7:
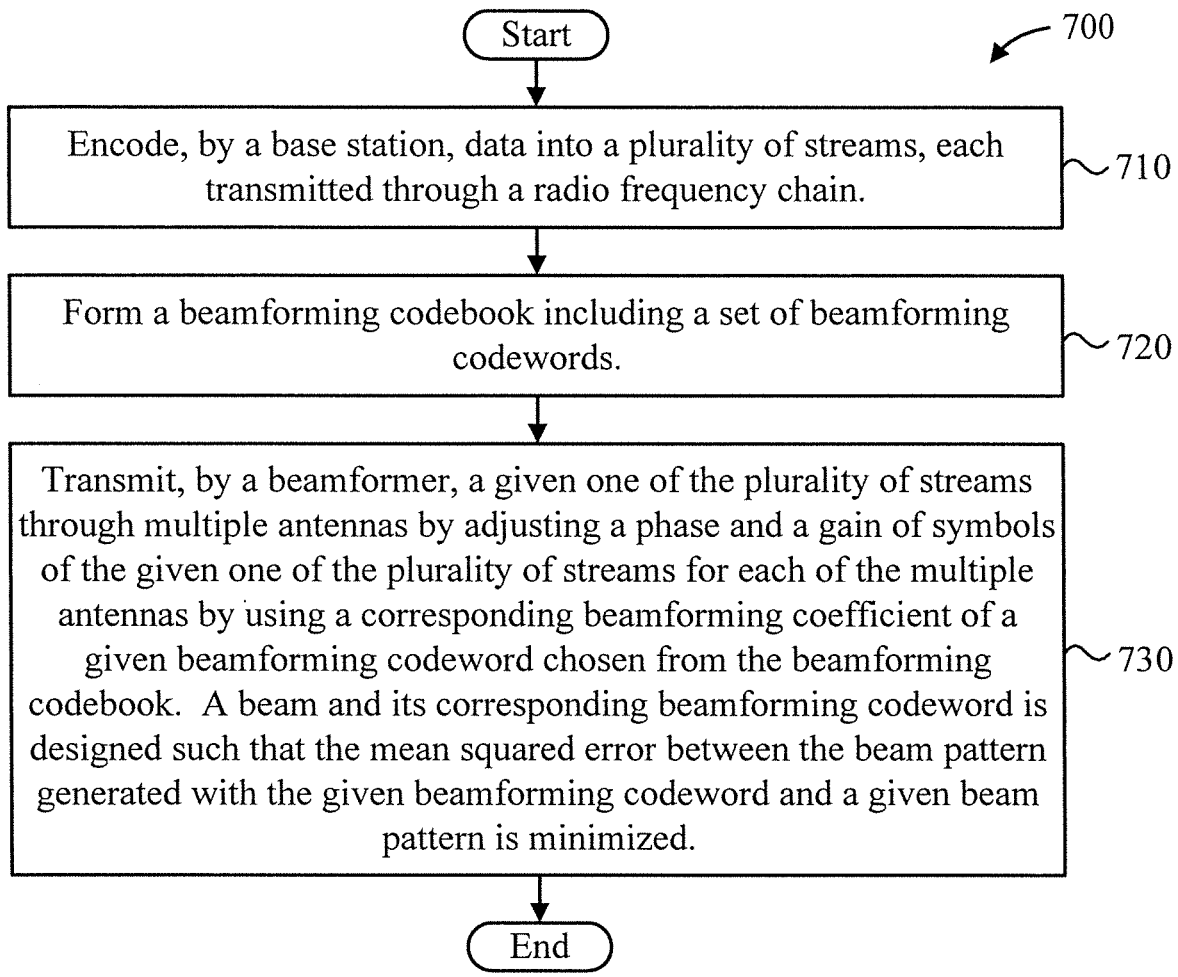
FIG. 7 shows an exemplary method for beamforming design for a Uniform Linear Array (ULA) antenna configuration, in accordance with an embodiment of the present invention.

FIG. 7 shows an exemplary method 300 for beamforming design for a Uniform Linear Array (ULA) antenna configuration, in accordance with an embodiment of the present invention.

At block 710, encode, by a base station, data into a plurality of streams, each transmitted through a radio frequency chain.

At block 720, form a beamforming codebook including a set of beamforming codewords.

At block 730, transmit, by a beamformer, a given one of the plurality of streams through multiple antennas by adjusting a phase and a gain of symbols of the given one of the plurality of streams for each of the multiple antennas by using a corresponding beamforming coefficient of a given beamforming codeword chosen from the beamforming codebook. A beam and its corresponding beamforming codeword is designed such that the mean squared error between the beam pattern generated with the given beamforming codeword and a given beam pattern is minimized.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B)

only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A communications system for hybrid beamforming, comprising:
    a base station encoding data into a plurality of streams, each transmitted through a radio frequency chain;
    a beamforming codebook comprising a set of beamforming codewords; and
    a beamformer transmitting a given one of the plurality of streams through multiple antennas by adjusting a phase and a gain of symbols of the given one of the plurality of streams for each of the multiple antennas by using a corresponding beamforming coefficient of a given beamforming codeword chosen from the beamforming codebook,
    wherein a beam and its corresponding beamforming codeword is designed such that the mean squared error between the beam pattern generated with the given beamforming codeword and a given beam pattern is minimized, wherein the beam pattern covers a given interval in azimuth angle with a constant gain.

2. The communications system of claim 1, wherein the beam are designed for Uniform Linear Arrays (ULA).

3. The communications system of claim 1, wherein the beam are designed for Uniform Planar Arrays (UPA).

4. The communications system of claim 1, wherein the beam are designed for a Twin Uniform Linear Array (TULA) antenna structure that is comprised of two Uniform Linear Arrays that are employed side by side.

5. The communications system of claim 4, wherein a distance between the two Uniform Linear Arrays is controlled to generate an asymmetric beam pattern.

6. The communications system of claim 1, wherein an absolute value of an $m^{th}$ beamforming coefficient for a beamforming codeword q is given by product of a constant factor and $\mathrm{sinc}(\delta_q(\eta+m))$, wherein $\delta_q$ and $\eta$ are two constant values.

7. The communications system of claim 6, wherein a smoothness and a sharpness of the beam is controlled by the constant value $\eta$.

8. The communications system of claim 4, wherein an element of one ULA using the beamforming coefficient w has a corresponding element in the other ULA for which the beamforming coefficient is given by $w=e^{jb}$, where b is a design constant and j is the square root of −1.

9. The communications system of claim 8, wherein the design constant b controls an isolation between the beam and a beam counterpart, the isolation being a ratio of the average power of the beam over the average power of the beam counterpart.

10. A method for hybrid beamforming in a communications system, comprising:
    encoding, by a base station, data into a plurality of streams, each transmitted through a radio frequency chain;
    a forming a beamforming codebook comprising a set of beamforming codewords; and
    transmitting, by a beamformer, a given one of the plurality of streams through multiple antennas by adjusting a phase and a gain of symbols of the given one of the plurality of streams for each of the multiple antennas by using a corresponding beamforming coefficient of a given beamforming codeword chosen from the beamforming codebook,
    wherein a beam and its corresponding beamforming codeword is designed such that the mean squared error between the beam pattern generated with the given beamforming codeword and a given beam pattern is minimized, wherein the beam pattern covers a given interval in azimuth angle with a constant gain.

11. The method of claim 10, wherein the beam are designed for Uniform Linear Arrays (ULA).

12. The method of claim 10, wherein the beam are designed for Uniform Planar Arrays (UPA).

13. The method of claim 10, wherein the beam are designed for a Twin Uniform Linear Array (TULA) antenna structure that is comprised of two Uniform Linear Arrays that are employed side by side.

14. The method of claim 13, wherein a distance between the two Uniform Linear Arrays is controlled to generate an asymmetric beam pattern.

15. The method of claim 10, wherein an absolute value of an $m^{th}$ beamforming coefficient for a beamforming codeword q is given by product of a constant factor and $\mathrm{sinc}(\delta_q(\eta+m))$, wherein $\delta_q$ and $\eta$ are two constant values.

16. The method of claim 15, wherein a smoothness and a sharpness of the beam is controlled by the constant value $\eta$.

17. The method of claim 13, wherein an element of one ULA using the beamforming coefficient w has a corresponding element in the other ULA for which the beamforming coefficient is given by $w=e^{jb}$, where b is a design constant and j is the square root of −1.

18. The method of claim 17, wherein the design constant b controls an isolation between the beam and a beam counterpart, the isolation being a ratio of the average power of the beam over the average power of the beam counterpart.

19. A communications system for hybrid beamforming, comprising:
    a base station encoding data into a plurality of streams, each transmitted through a radio frequency chain;
    a beamforming codebook comprising a set of beamforming codewords; and
    a beamformer transmitting a given one of the plurality of streams through multiple antennas by adjusting a phase and a gain of symbols of the given one of the plurality of streams for each of the multiple antennas by using a corresponding beamforming coefficient of a given beamforming codeword chosen from the beamforming codebook, wherein a beam and its corresponding beamforming codeword is designed such that the mean squared error between the beam pattern generated with the given beamforming codeword and a given beam pattern is minimized, wherein an absolute value of an $m^{th}$ beamforming coefficient for a beamforming codeword q is given by product of a constant factor and $\text{sinc}(\delta_q(\eta+m))$, wherein $\delta_q$ and $\eta$ are two constant values.

* * * * *